(12) United States Patent
Griffin (10) Patent No.: US 9,255,495 B2
(45) Date of Patent: Feb. 9, 2016

(54) MAGNETICALLY-COUPLED DAMPER FOR TURBOMACHINERY

(75) Inventor: Timothy R. Griffin, Allegany, NY (US)

(73) Assignee: Dresser-Rand Company, Olean, NY (US)

(*) Notice: Subject to any disclaimer, the term of this patent is extended or adjusted under 35 U.S.C. 154(b) by 123 days.

(21) Appl. No.: 13/589,276

(22) Filed: Aug. 20, 2012

(65) Prior Publication Data

US 2013/0216351 A1    Aug. 22, 2013

Related U.S. Application Data (60) Provisional application No. 61/526,910, filed on Aug. 24, 2011.

(51) Int. Cl.
| | |
|---|---|
| *F01D 25/06* | (2006.01) |
| *F16F 15/03* | (2006.01) |
| *F16C 39/06* | (2006.01) |
| *F01D 5/10* | (2006.01) |
| *F01D 25/04* | (2006.01) |
| *F16F 15/023* | (2006.01) |
| *F16C 32/04* | (2006.01) |

(52) U.S. Cl.
CPC ...... *F01D 25/06* (2013.01); *F01D 5/10* (2013.01); *F01D 25/04* (2013.01); *F16C 39/066* (2013.01); *F16F 15/023* (2013.01); *F16F 15/035* (2013.01); *F16C 32/0425* (2013.01); *F16C 32/0438* (2013.01)

(58) Field of Classification Search
CPC .............................. F16D 25/06; F16F 15/035
USPC ......... 188/321.11, 325, 161, 322.19, 271, 78,
188/164, 73.35, 74, 267.1, 266.3, 378–380;
74/574.1, 572.2, 574.4, 572.1; 464/29;
310/90.25, 92, 105, 103–104
See application file for complete search history.

(56) References Cited

U.S. PATENT DOCUMENTS

| | | | |
|---|---|---|---|
| 2,802,122 A | 8/1957 | Riordan et al. | |
| 3,699,369 A | 10/1972 | Hlipala et al. | |
| 4,141,604 A | 2/1979 | Habermann et al. | |
| 4,200,003 A | 4/1980 | Miller | |
| 4,334,718 A * | 6/1982 | Hirt | F16C 27/04 310/90.5 |
| 4,517,505 A | 5/1985 | Cunningham | |
| 4,766,362 A * | 8/1988 | Sadvary | H02K 21/16 310/90 |
| 4,988,906 A | 1/1991 | Littlefield | |

(Continued)

FOREIGN PATENT DOCUMENTS

EP    0875694 B1    1/2006

OTHER PUBLICATIONS

Eichenberg, Dennis J., et al., "Development of a 32 Inch Diameter Levitated Ducted Fan Conceptual Design", National Aeronautics and Space Administration, Glenn Research Center, Cleveland, Ohio, Dec. 2006, 40 pages.

*Primary Examiner* — Anna Momper
*Assistant Examiner* — San Aung
(74) *Attorney, Agent, or Firm* — Edmonds & Nolte, PC (57) ABSTRACT

A system, method, and apparatus for damping vibration in a rotor supported by primary bearings are provided. The system includes a magnetic coupling configured to magnetically engage a rotor supported by one or more primary bearings, and a piston coupled to the magnetic coupling. The system also includes a damper engaging the piston and configured to damp the rotor, wherein the damper is substantially non-load bearing.

12 Claims, 8 Drawing Sheets

(56) References Cited

U.S. PATENT DOCUMENTS

| | | |
|---|---|---|
| 5,053,662 A | 10/1991 | Richter |
| 5,126,610 A | 6/1992 | Fremerey |
| 5,191,811 A | 3/1993 | Kogure |
| 5,347,190 A | 9/1994 | Lewis et al. |
| 5,355,042 A | 10/1994 | Lewis et al. |
| 5,445,249 A * | 8/1995 | Aida .................... F16F 15/03 188/267 |
| 5,495,221 A | 2/1996 | Post |
| 5,521,448 A * | 5/1996 | Tecza ................ F16C 32/0412 310/51 |
| 5,736,798 A | 4/1998 | O'Brien et al. |
| 5,834,867 A * | 11/1998 | Kikuchi ................ G01M 7/045 310/103 |
| 6,191,513 B1 | 2/2001 | Chen et al. |
| 6,255,752 B1 | 7/2001 | Werner |
| 7,806,774 B2 | 10/2010 | Manfredotti et al. |
| 7,914,383 B2 | 3/2011 | Vignal |
| 2002/0047400 A1 * | 4/2002 | Ueyama ................... H02K 7/09 310/90.5 |
| 2004/0004161 A1 * | 1/2004 | Osterberg .............. B64G 1/641 244/165 |
| 2005/0230206 A1 * | 10/2005 | Stewart .................. B60L 7/003 188/381 |
| 2007/0205681 A1 * | 9/2007 | Corbin, III ............. H02K 49/02 310/105 |
| 2008/0116316 A1 | 5/2008 | Manfredotti et al. |
| 2008/0252162 A1 | 10/2008 | Post |
| 2008/0293503 A1 | 11/2008 | Vignal |
| 2009/0046963 A1 | 2/2009 | Ozaki et al. |
| 2010/0127589 A1 | 5/2010 | Kummeth |

* cited by examiner

MAGNETICALLY-COUPLED DAMPER FOR TURBOMACHINERY

The present application claims priority to U.S. Provisional Patent Application Ser. No. 61/514,545, which was filed Aug. 3, 2011. This priority application is hereby incorporated by reference in its entirety into the present application, to the extent that it is not inconsistent with the present application.

BACKGROUND

Turbomachinery rotors are often designed to operate at rotational speeds at, near, or above at least one of the resonant frequencies of system. Due to residual unbalance, the rotors often exhibit a synchronous response to rotation that tends to increase in amplitude at frequencies nearing the system natural frequencies, especially when the resonances are lightly damped. Further, even when the rotor is operating sufficiently far away from its resonant frequencies, periodic excitation forces may be incident on the rotor, which may have a frequency at or near the resonant frequency of the rotor. The application of such excitation forces may lead to instability in the system, such that the vibration grows and can cause damage to the machinery.

Damper bearings are employed in turbomachinery to provide damping and stiffness to the rotor, thereby supporting the rotor and reducing vibration. Such damper bearings are typically mounted on squeeze film or metal-mesh (i.e., mechanical spring) systems to transmit bearing loads to the bearing supports, while increasing total system damping. One drawback to these traditional damper bearings, however, is that they must be supported by a relatively flexible spring (or equivalent structure). Accordingly, the static load applied by the rotor on this spring introduces rotor eccentricity with respect to the bearing and any other static components. As such, system designers are often required to add additional components to reduce such eccentricity, which adds complexity and additional space requirements to the system.

Active magnetic damper bearings have been proposed to overcome these difficulties by applying variable force to the rotor to control its position in real time. These bearings, however, require a complex system of electromagnets, sensors, sensor wiring, power wiring, power amplifiers, a controller, and a back-up power supply, etc. Even with redundancy components, however, the active nature and complexity of the system increases the likelihood of failure and increases system cost.

What is needed is a damper that does not act as a static rotor-support or centering device but that provides effective damping, without suffering from a significantly increased likelihood of failure and/or cost.

SUMMARY

Embodiments of the disclosure may provide an exemplary damper system for a rotor. The system includes a magnetic coupling configured to magnetically engage a rotor supported by one or more primary bearings, and a piston coupled to the magnetic coupling. The system also includes a damper engaging the piston and configured to damp the rotor, wherein the damper is substantially non-load bearing.

Embodiments of the disclosure may also provide an exemplary apparatus for damping vibration in a rotor supported by primary bearings. The apparatus includes a first magnetic coupling element coupled to the rotor, and a piston including a second magnetic coupling element magnetically engaging the first magnetic coupling element. The apparatus also includes an eddy current damper engaging the piston and being configured to damp movement of the rotor via the magnetic engagement of the first and second magnetic coupling elements and the coupling of the piston to the second magnetic coupling element.

Embodiments of the disclosure may further provide an exemplary method for damping a rotor. The method includes magnetically engaging the rotor with a magnetic element of a piston of a damper system, wherein the damper system does not support a static load of the rotor. The method also includes damping motion of the piston with an eddy current damper to damp motion of the rotor.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

Figure 1:
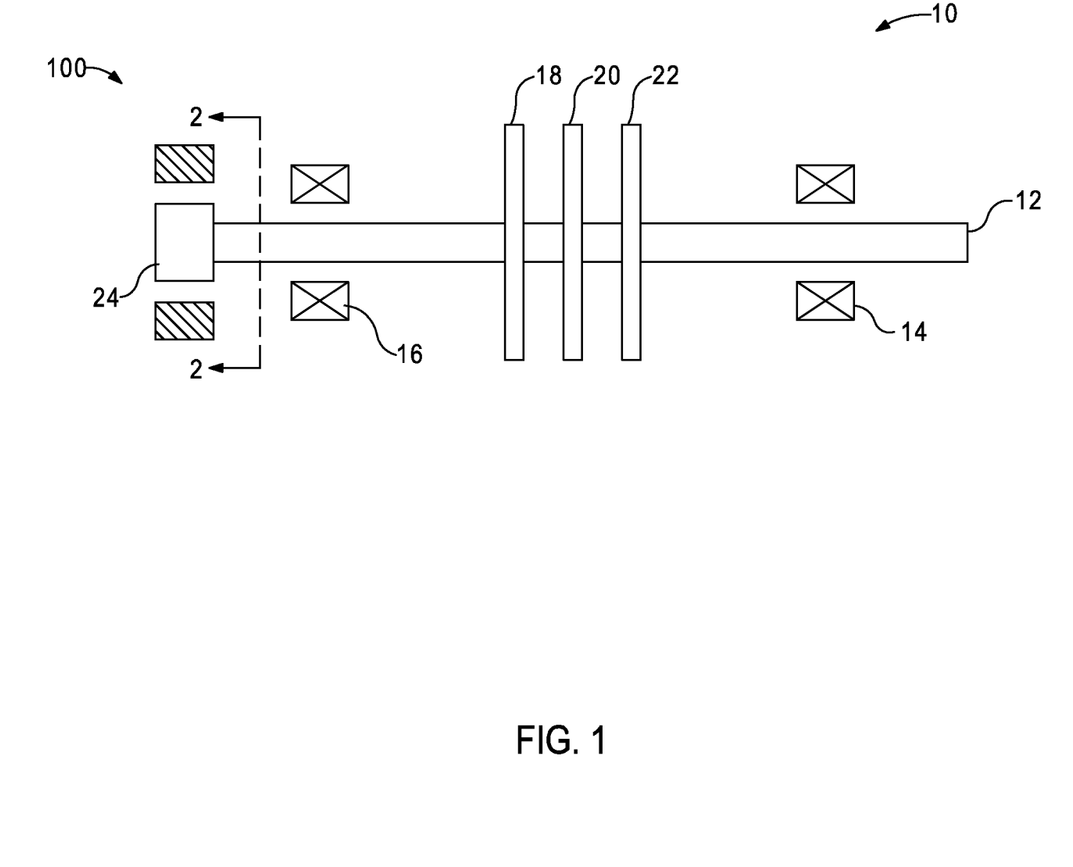
FIG. 1 illustrates a schematic view of an exemplary turbomachine, according to an embodiment.

FIG. 1 illustrates a schematic, side view of an exemplary rotary machine 10, according to one or more embodiments. The rotary machine 10 includes a rotor 12 and one or more radial bearings (two are shown: 14, 16). The rotor 12 may also include one or more disks (three shown: 18, 20, 22), which may be configured to transfer energy between the rotor 12 and a process fluid. Thus, the machine 10 may be a turbomachine, such as a fan, blower, pump, compressor (e.g., axial, centrifugal, or any other type), turbine, a combination thereof, or the like. Accordingly, the illustrated disks 18-22 may be representative of one or more impellers, blades, nozzles, combinations thereof, or the like. In other embodiments, however, the machine 10 may be a motor, such as a high-speed electric motor, a gas or diesel engine, or any other machine with a high-speed rotating body. The rotor 12 is supported at least radially by the bearings 14, 16. The bearings 14, 16 may also support the rotor 12 against axial loads, and/or axial thrust bearings, balance pistons, or the like (not shown) may be provided to support the axial loads on the rotor 12.

The exemplary machine 10 further includes one or more damper systems (one shown: 100). The damper system 100 is coupled to the rotor 12, for example, via a magnetic engagement with a disk 24 coupled to the rotor 12. Accordingly, the damper system 100 may be physically separated, radially apart from the disk 24. The static loads (e.g., weight or other generally constant loads) and dynamic loads on the rotor 12 may be supported by the bearings 14, 16 or other components, while the damper system 100 provides damping, but generally no static load support, thereby reducing vibration amplitude in the rotor 12. Accordingly, the damper system 100 may be significantly less stiff than would be a load-supporting bearing, without sacrificing increased eccentricity of the rotor 12. Further, in some embodiments, the damper system 100 may provide effective damping over a smaller range of motion than with traditional damper systems. Such vibration in the rotor 12 can be caused by periodic excitation forces, running the rotor 12 proximal a resonant frequency thereof, including during coast-down and/or startup, or in any other way.

Figure 2:
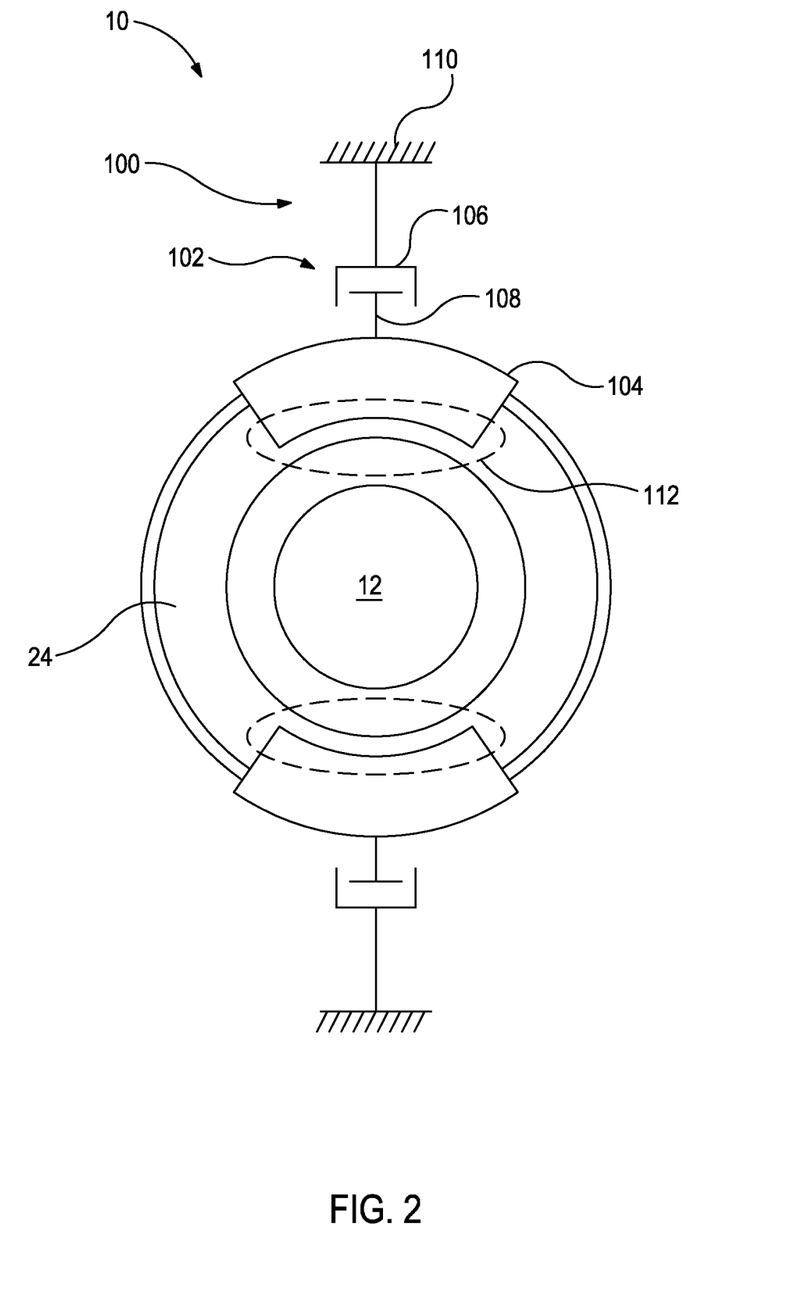
FIG. 2 illustrates a schematic, end view of the turbomachine of FIG. 1, taken along line 2-2 of FIG. 1.

FIG. 2 illustrates a schematic, end view of the exemplary rotary machine 10, taken along line 2-2 of FIG. 1. As shown, the damper system 100 includes a dashpot 102 and a magnetic coupling 104. The dashpot 102 generally includes two relatively movable portions: a housing 106 and a piston 108 received at least partially in the housing 106. In the illustrated embodiment, the housing 106 is coupled to the ground 110 (or another static structure), for example, by way of a supportive coupling with a casing (not shown) of the machine 10. The piston 108 may be coupled with the magnetic coupling 104, thus moving at least radially therewith relative to the ground 110 by movement (e.g., vibration) of the rotor 12. It will be appreciated that in various embodiments the piston 108 may be coupled to the ground 110, while the housing 106 is coupled to the magnetic coupling 104, without departing from the scope of this disclosure. Further, the dashpot 102 can be any suitable type of damping device, such as a fluid dashpot or even multiple damping devices connected in series or parallel.

The magnetic coupling 104 may include first and second magnetic coupling elements (not shown), as will be described in greater detail below. For the purposes of describing this Figure, however, the first magnetic coupling element is fixed to the disk 24 and the second magnetic coupling element is spaced apart therefrom and magnetically engaging the first magnetic element via a magnetic field 112. Accordingly, as the rotor 12 vibrates, the piston 108 is urged to move relative the housing 106. However, the dashpot 102 retards the movement, thereby damping the rotor 12 vibration, such that the damper system 100 resists non-rotational movement of the rotor 12.

Figure 3:
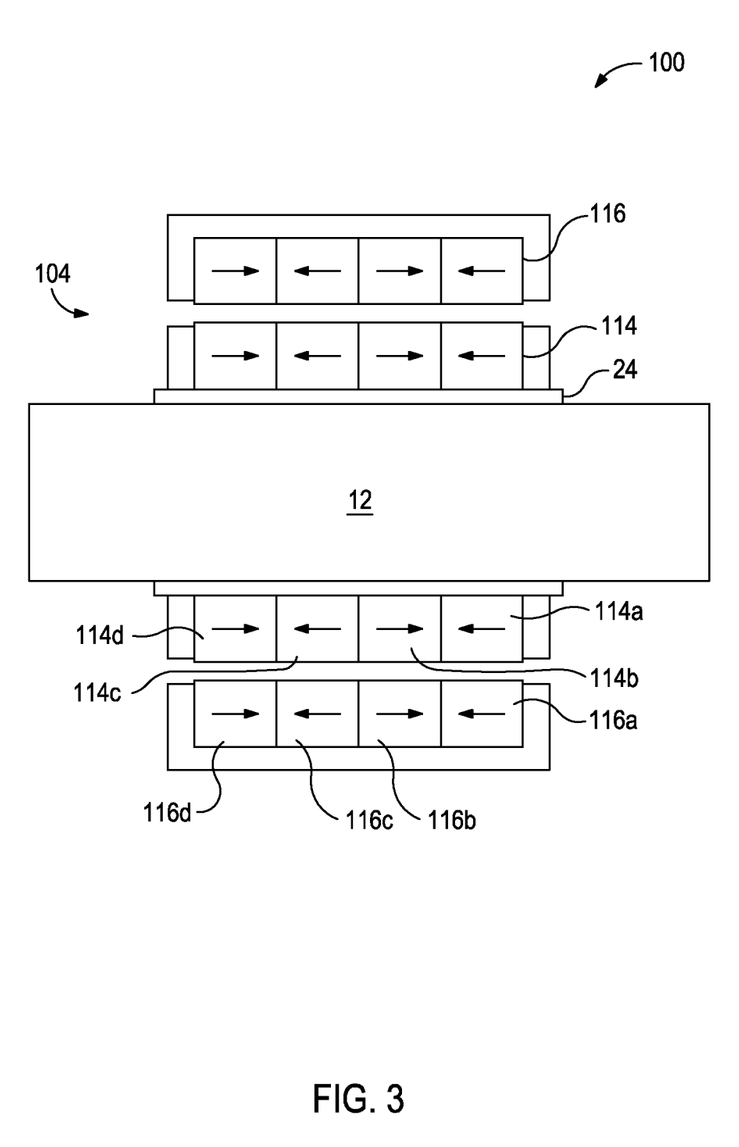
FIG. 3 illustrates a schematic, side, cross-sectional view of an exemplary damper, according to an embodiment.

FIG. 3 illustrates a schematic, side, cross-sectional view of the exemplary damper system 100, further depicting the magnetic coupling 104, according to an embodiment. As shown, the magnetic coupling 104 includes first and second magnetic coupling elements 114, 116, which, more particularly may be referred to as a rotary section 114 and a stationary section 116. The rotary section 114 may be coupled to and/or form part of the disk 24 and may be configured to rotate with the rotor 12. The stationary section 116 may be disposed around the rotary section 114 and may be generally restrained from rotation. Further, the stationary section 116 may be coupled to and/or form at least part of the piston 108.

The rotary and stationary sections 114, 116 may each include one or more block and/or ring-shaped magnets 114a, 114b, 114c, 114d and 116a, 116b, 116c, 116d, respectively. Each magnet 114a-d, 116a-d may include one or a plurality of magnets, which may be disposed in a heteropolar or a homopolar arrangement. Further, the magnets 114a-d, 116a-d may be or include permanent magnets, which may be, for example, magnetic blocks arranged in a Halbach array, as is well-known, with an exemplary implementation described in detail in Eichenbert, et al., "Development of a 32 inch Diameter Levitated Ducted Fan Conceptual Design," NASA/TM-2006-214481 (2006), the entirety of which is incorporated herein by reference to the extent this disclosure is consistent with the present disclosure. In lieu of or in addition to permanent magnets, the magnets 114a-d, 116a-d may include electromagnets coupled to a source of electrical current (not shown). Such electromagnets may be passively or actively controlled via position sensors, a controller, and a feedback loop (not shown). Additionally, the magnetic coupling 104 may be provided by one or more magnetic rings disposed around the rotor 12.

The magnets 114a-d, 116a-d may be configured to apply either an attractive or a repulsive force between the rotary and stationary sections 114, 116, with each point around the rotor 12 having a radially opposite point applying an opposing radial force such that substantially no net force is applied when the rotor 12 is centered in the damper system 100. Moreover, individual embodiments may employ a combination of permanent and electromagnets for the magnets 114a-d, 116a-d as desired.

Figure 4:
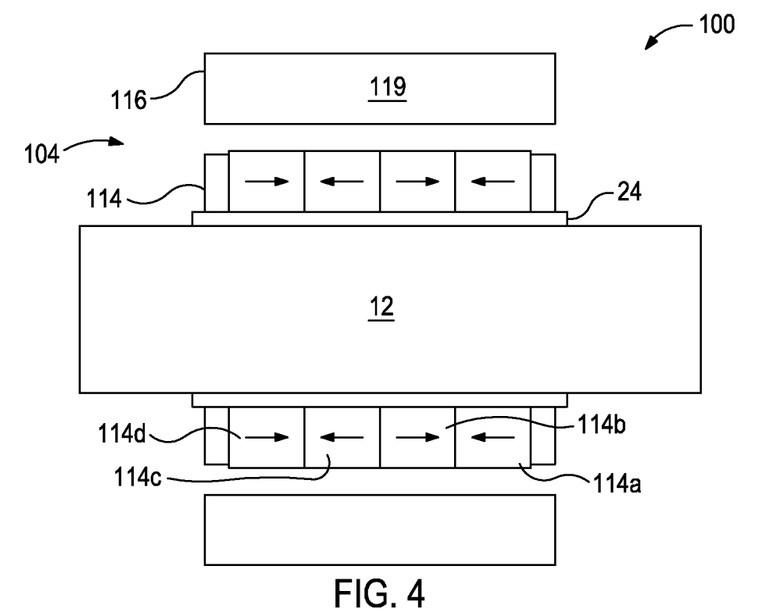
FIG. 4 illustrates a schematic, side, cross-sectional view of another exemplary damper, according to an embodiment.
Figure 5:
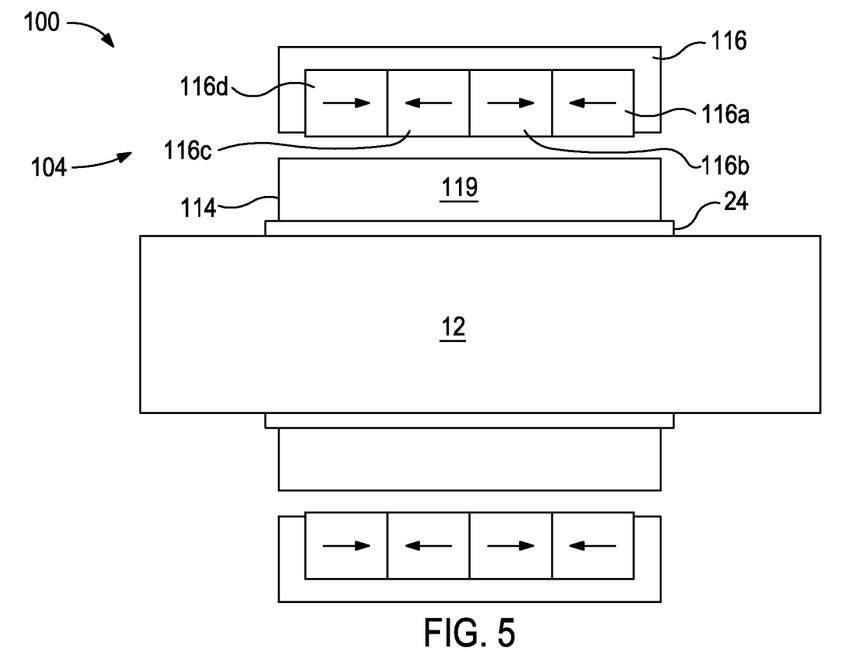
FIG. 5 illustrates a schematic, side, cross-sectional view of yet another exemplary damper, according to an embodiment.

FIGS. 4 and 5 illustrate two schematic, side, cross-sectional views of two additional exemplary embodiments of the magnetic coupling 104 of the damper system 100. As shown, the magnetic coupling 104 may include the rotary section 114 and a stationary section 116, which are magnetically coupled together. The stationary section 116 may be mechanically coupled to or provide at least a portion of the piston 108 (FIGS. 1 and 2) for the dashpot 102 (FIG. 2). The rotary section 114 may be mechanically coupled to and/or may form part of the disk 24 and is configured to rotate with the rotor 12. In some embodiments, however, the disk 24 may be unnecessary and omitted. As illustrated in FIG. 4, the rotary section 114 may include magnets 114a-d, while the stationary section 116 lacks magnets. As illustrated in FIG. 5, however, the stationary body 116 may include the magnets 116a-d, while the rotary section 114 omits magnets. In either exemplary case, the magnets 114a-d, 116a-d may be ring magnets, block magnets, or a combination thereof, and may be oriented in a Halbach array or in any other configuration suitable, as described above with reference to FIG. 3. Further, the magnets 114a-d, 116a-d may have a relatively low tensile strength and thus may be covered with a non-conductive sleeve (not shown) to protect the integrity of the magnetic coupling 104.

When one of the stationary and rotary sections 114, 116 omits magnets, as shown in FIGS. 4 and 5, it may be at least partially formed from a sleeve 119 or an arcuate portion thereof, made of conductive material. For example, as shown in FIG. 4, the stationary section 116 may be provided by the sleeve 119, or may include the sleeve 119 inlaid or otherwise retained therein. Any conductive material may be employed for the sleeve 119; however, in some embodiments, a superconductor may be used. Accordingly, during rotation, the magnetic field (not shown) produced by the relative rotation of the magnets 114a-d with respect to the conductor (or superconductor) induces a current in the conductive material, resulting in an induced magnetic field that resists movement of the rotary section 114. Since the rotary section 114 is coupled to the rotor 12, radial vibration of the rotor 12 results in radial movement of the rotary section 114 with respect to the stationary section 116, which is resisted by the interaction between the magnetic fields of the rotary and stationary sections 114, 116 of the damper system 100. This force is then passed through to accelerate the piston 108 (FIG. 2), which is acted upon by the dashpot 102 (FIG. 1).

Similarly, as shown in FIG. 5, the disk 24 may be coupled to the sleeve 119 of conductive material. In other embodiments, the sleeve 119 may be inlaid or otherwise retained with the disk 24, for example, to allow use of other (e.g., less expensive) material for the disk 24. Further, in some embodiments, the disk 24 may be omitted and the conductive sleeve 119 coupled directly to the rotor 12, or the rotor 12 itself may provide the conductive material, obviating any need for the conductive sleeve 119. Further, although not shown, the sleeve 119 may be made up at least partially of a plurality of thin disks or laminations, which may be separated by a thin disk of non-conductive material, to reduce the strength of the induced eddy currents.

Figure 6:
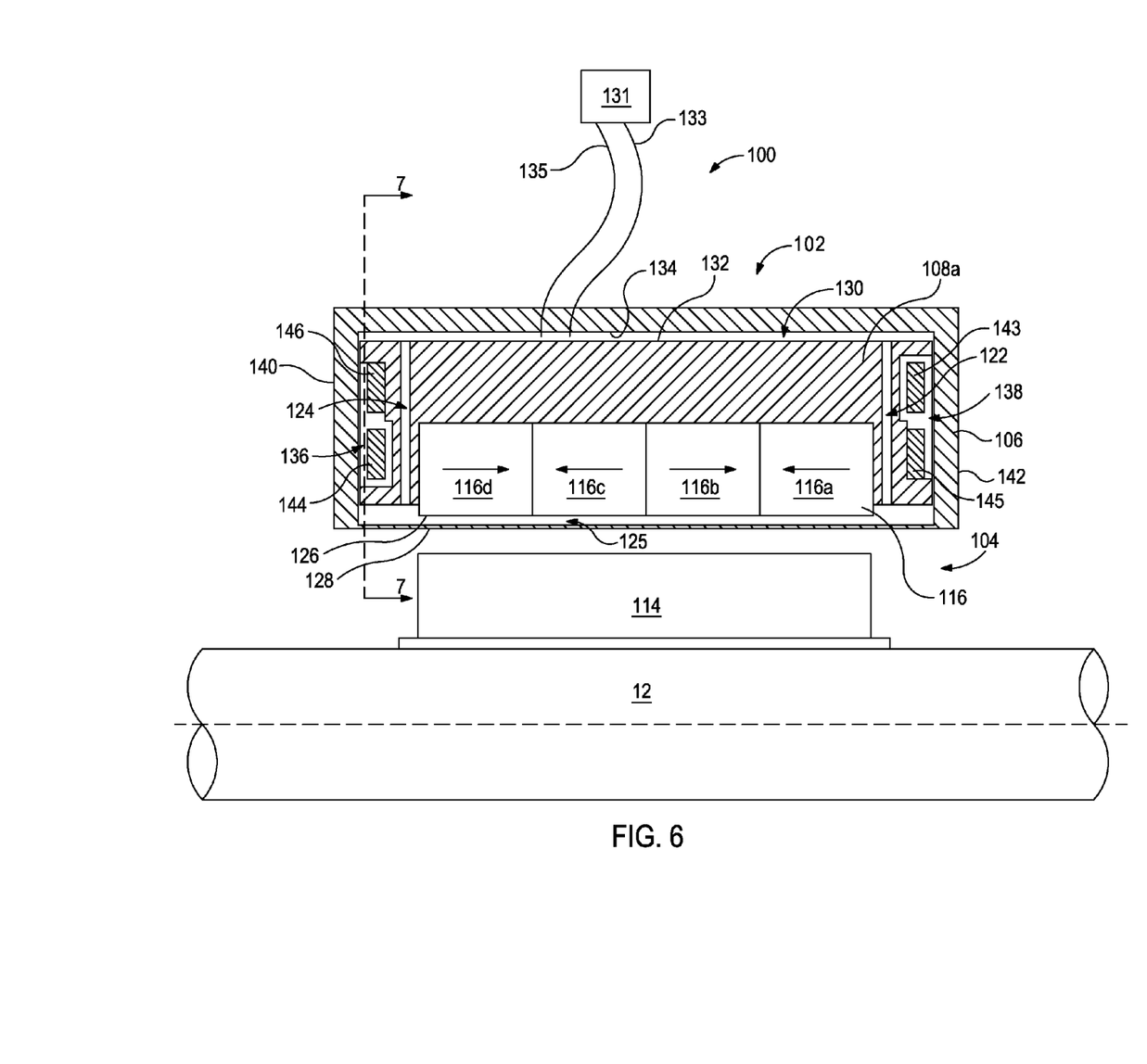
FIG. 6 illustrates a side, cross-sectional view of still another exemplary damper, according to an embodiment.

FIG. 6 illustrates a partial, side, cross-sectional view of the exemplary damper system 100, according to an embodiment. The damper system 100 includes the housing 106, with a piston segment 108a disposed therein, providing the dashpot 102. The rotary section 114 of the magnetic coupling 104 is also disposed in the housing 106, and is coupled to the piston segment 108a. As shown, the stationary section 116 includes magnets 116a-d; however, in other embodiments, it may omit such magnets and may instead be at least partially made of a conductor or superconductor, and/or the rotary section 114 may include the magnets 114a-d (FIG. 4), as described above.

The housing 106 may provide a fluid-tight enclosure around the stationary section 116. Further, the piston segment 108a may define one or more orifices (two are shown: 122 and 124) extending radially therethrough. The orifices 122, 124 may communicate with a first space 125 defined between an inner radial side 126 of the piston segment 108a (which may also be the inner radial side of the stationary section 116 of the magnetic coupling 104) and an inner radial wall 128 of the housing 106. The orifices 122, 124 may also communicate with a second space 130 at least partially defined between an outer radial side 132 of the piston 108 and an outer radial side 134 of the housing 106. A viscous damping fluid may be disposed in the housing 106, such that it substantially fills the spaces 125, 130, the orifices 122, 124, and any other empty space in the housing 106. Accordingly, radial movement of the piston segment 108a may require the damping fluid to be forced through one or both of the orifices 122, 124, to allow one of the spaces 125, 130 to decrease in volume while the other increases.

The piston segment 108a may also define one or more circumferentially-extending cavities (two are shown: 136, 138) positioned, for example, proximal axial endwalls 140, 142 of the housing 106. One or more rings (four are shown: 143, 144, 145, 146) may be disposed in the annular cavities 136, 138. The rings 143-146 may be rigid, and rings 145, 146 may be coupled (e.g., fastened or welded) to the piston segment 108a. The rings 144, 143 may be provided with a clearance in the cavities 136, 138, respectively, as shown, such that the rings 144, 143 generally do not restrict movement of the piston segment 108a within a given range. The rings 143, 144, with the provided clearance, may be coupled to other piston segments (not shown), disposed around the rotor 12 (FIGS. 1-4), as will be described in greater detail below, and thus may be configured to pass through the piston segment 108a without restrictively engaging the piston segment 108a.

The damper system 100 may also include a dashpot fluid cooling system 131, with a conduit 133 extending from within the housing 106 to the cooling system 131, and a conduit 135 extending from the cooling system 131 to the housing 106. The cooling system 131 may be a heat exchanger provided with a flow of cooling fluid. In other embodiments, the cooling system 131 may be a refrigerant cycle, or may be any other device capable of cooling dashpot fluid directed thereto by the conduit 135.

Figure 7:
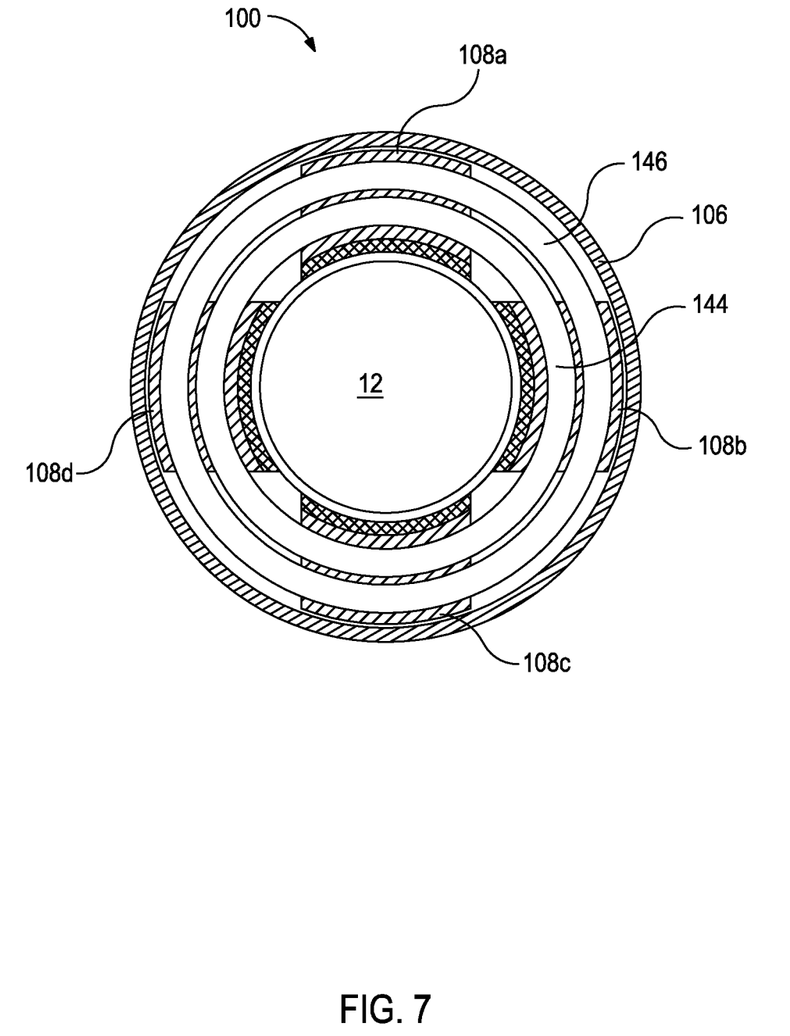
FIG. 7 illustrates an end view of the damper of FIG. 6, taken along lines 7-7 of FIG. 6.

FIG. 7 illustrates an end, sectional view of the damper system 100 of FIG. 6, taken along line 7-7 as indicated therein. The illustrated housing 106 is disposed around the rotor 12, and spaced radially therefrom so as to generally avoid physical contact therewith. The damper system 100 also includes a plurality of arcuate piston segments 108a, 108b, 108c, 108d, which together provide the piston 108 (FIG. 1) and are disposed at angular intervals in the housing 106 and around the rotor 12. The piston segments 108a-d may also be characterized as four individual pistons 108a-d. The piston segment 108a described above with reference to FIG. 6 may be generally representative of each of the piston segments 108a-d and, accordingly, each may include the same or similar orifices, cavities, etc., as described above. Moreover, the damping fluid may fill the areas between the piston segments 108a-d and between the piston segments 108a-d and the housing 106, thereby providing a sealed dashpot 102 (FIG. 1).

With additional reference to FIG. 6, the rings 143-146 (144 and 146 are viewable in FIG. 7, while all four rings 143-146 are viewable in FIG. 6) may be configured to couple diametrically-opposed piston segments 108a-d together. For example, the rings 145, 146 may couple the piston segment 108a to the piston segment 108c; accordingly, to move the piston segment 108a radially-outward (i.e., upward, as shown in FIG. 7), the piston segment 108c must move radially-inward as the ring 146 is pulled upward by the piston segment 108a. Similarly, the rings 143, 144 may couple the piston segment 108b to the piston segment 108d, such that radial movement of one of the piston segments 108b,d requires radial movement of the other, for example. It will be appreciated that additional or fewer rings may be employed without departing from the scope of this disclosure. Furthermore, although the piston 108 is illustrated herein as segmented, it will be appreciated that the piston 108 may be annular, extending entirely around the rotor 12 as a single, monolithic structure.

Referring now to FIGS. 1-7, in exemplary operation, the rotary section 114 and the stationary section 116 are magnetically coupled together, either by magnet-to-magnet engagement (e.g., FIG. 3) or by induced fields caused by relative rotation of the stationary and rotary sections 116, 114 (e.g., FIGS. 4 and 5). Referring specifically to FIGS. 6 and 7, vibration or other radial movement in the rotor 12 may cause the rotor 12 to shift toward piston segment 108a, for example. This movement of the rotor 12 also applies a force on the piston segment 108a, urging it radially-outward and away from the rotor 12. For the piston segment 108a to move outward, the damping fluid must be forced through the orifices 122, 124, for example, as the piston segment 108a moves to reduce the volume in the second space 130. The damping fluid is viscous and thus requires time to proceed through the orifices 122, 124 and generates frictional losses, resulting in movement of the piston segment 108a lagging the movement of the rotor 12 and dissipating the kinetic energy associated with damper vibration as thermal energy leading to heating of the damper fluid. Accordingly, as the rotor 12 moves closer to the piston segment 108a, out of phase with the movement of the piston segment 108a, the repulsive forces between the rotary and stationary sections 114, 116 increase, thereby proportionally resisting the movement of the rotor 12 and damping the vibration thereof.

The rotor 12 may then move back toward the piston segment 108c, which may still be moving inward, as the piston segment 108a movement lags the rotor 12 vibration. Accordingly, vibration energy is dissipated as the rotor 12 overcomes the forces applied by the interaction between the magnetic fields in the magnetic coupling 104, pushes the piston segment 108c radially-outward, and leads to viscous damping of the motion of the piston segment 108c. The piston segment 108c movement is retarded by the viscous damping fluid, again resulting in the piston segment 108c movement being out of phase with the movement of the rotor 12. The cycle can repeat for each set of piston segments 108a-d, such that vibration is damped and vibration energy dissipated by the damper system 100.

Accordingly, two modes of vibration reduction are seen: one provided by the movement of the piston segments 108a-d in the dashpot fluid, and a second as the rotor 12 moves relative the piston segments 108a-d in the magnetic fields 112 (FIG. 1). Although present, the second mode generally provides a relatively small amount of vibration reduction as compared to the damping provided by the dashpot 102.

The movement of the piston segments 108a-d and consequential movement of the damping fluid may result in heating of the damping fluid. As such, the housing 106 may be fitted with fins or other heat sinks, exterior refrigeration systems, or the like, such that the housing 106 remains a closed or semi-closed system with respect to the damping fluid. In other embodiments, the dashpot cooling system 131 is provided to cool and/or otherwise condition the dashpot fluid, and return it to the housing 106 via the conduit 135. In still other embodiments, bearing fluid pumped to the primary bearings 14, 16 (FIG. 1) can be bled from the primary bearing fluid supply system (not shown) of the machine 10 and then supplied to the housing 106 for use as the damping fluid. Once heated, the bearing/damping fluid may then be expelled from the housing 106 to maintain a safe and effective temperature in the housing 106. Additionally, process fluid, which may be conditioned or not, may be used for damping fluid. The heated process fluid/damping fluid may then be returned to the process fluid flowpath or, in some embodiments, may be discharged to the ambient surroundings (e.g., if the process fluid is air or water).

Another advantage of the exemplary damper system 100 is that the housing 106 can be entirely enclosed and sealed apart from the rotor 12, as the engagement between the rotary and stationary sections 114, 116 is magnetic, and thus generally does not require mechanical engagement therebetween. As such, the internal components of the damper system 100 may be protected from the environment, which may be, for example, corrosive.

The damper system 100 may additionally or instead be configured to damp and/or reduce axial vibration in the rotor 12. Accordingly, rather than engaging the radial outside of the rotor 12 (i.e., via the disk 24), the magnetic coupling 104 may be between one or both axial faces of the disk 24 and the dashpot 102. In such an embodiment, the rotary section 114 may be disposed on an axial face of the disk 24, while the stationary section 116 is axially aligned therewith, such that axial movement of the rotor 12, and thus the disk 24, causes the rotary section 114 to move closer to or farther away from the stationary section 116. The resulting forces on the stationary section 116 cause the piston 108 to move, albeit out of phase with the vibration due to the viscous damping provided by the damping fluid. Accordingly, the damper system 100 engagement with the rotor 12 results in damping of axial vibration in the rotor 12. Furthermore, vibration energy from the rotor 12 is expended to push or pull the rotary section 114 through the magnetic fields produced by or induced in the rotary and stationary sections 114, 116. Thereby reducing vibration by reducing the energy remaining for displacement of the rotor 12.

Figure 8:
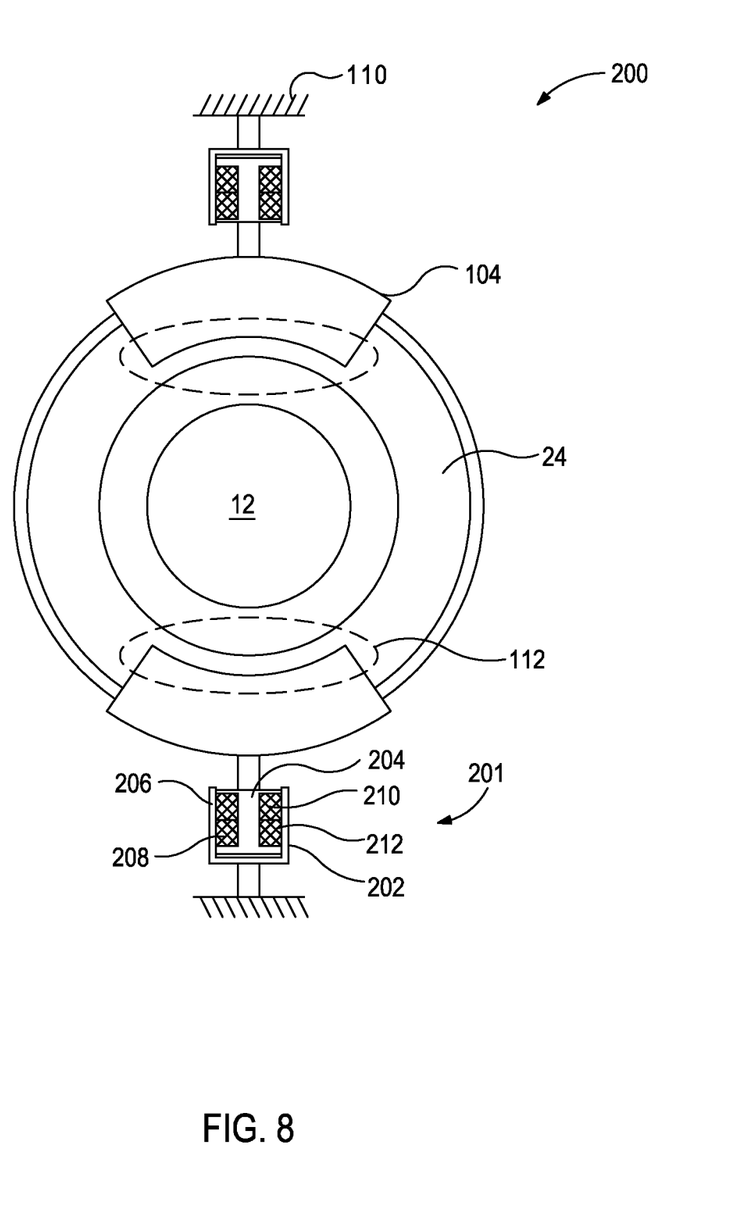
FIG. 8 illustrates a schematic, end view of another exemplary damper, according to an embodiment.

FIG. 8 illustrates a schematic, end view of an exemplary damper system 200, according to one or more embodiments. The damper system 200 may be similar in structure and operation to the damper system 100 shown in and described above with reference to FIGS. 1-6 and may thus be best understood with reference thereto. Accordingly, like elements are provided with like numbers and will not be described in duplicate herein. The illustrated damper system 200 employs an eddy current damper 201 in lieu of the dashpot 102 (FIGS. 1-7) to provide damping of the rotor 12. However, it will be readily appreciated that embodiments of the damper systems 100, 200 including both the dashpot 102 and an eddy current damper 201 are within the scope of the disclosure.

The exemplary eddy current damper 201 includes a housing or cylinder 202 and a piston 204. The piston 204 includes one or more magnets (four are shown: 206, 208, 210, and 212) which may be permanent magnets or electromagnets. The housing 202 may be or include a conductive material, such that relative movement of the magnetic piston 204 in the conductive housing 202 results in the formation of eddy currents in the housing 202. It will be appreciated, however, that the housing 202 may instead include the magnets 206-212 and the piston 204 may include the conductive material. Further, the housing 202 need not be cylindrical in some embodiments, but may take any suitable shape, such as prismatic or the like, as desired for implementation. The induced eddy currents produce a magnetic field (not shown) that opposes motion of the piston 204 relative the housing 202.

The housing 202 may be coupled to the ground 110, for example, via a supportive connection with a casing (not shown) of the machine 10 (FIG. 1). The piston 204 may be coupled to the stationary section 116 (FIGS. 2-4) of the magnetic coupling 104, for example, such that radial (e.g., vibrational) movement of the rotor 12 translates into movement of the piston 204. The housing 202 of the eddy current damper 201 may be sealed and may extend around the rotor 12, for example, as described above for the housing 106 shown in FIGS. 6 and 7. Further, the piston 204 may be contained in the sealed housing 202 and may be segmented or annular, similar to the piston 108 in the housing 106. However, the housing 202 may not include/contain dashpot fluid, as the useful damping forces are supplied by eddy currents, as will be described below.

In exemplary operation, radial movement of the rotor 12 results in movement of the piston 204 in the housing 202. When the piston 204 moves with respect to the housing 202, eddy currents are produced, which result in a magnetic field (not shown) that resists the movement of the piston 204 with respect to the housing 202. As such, the eddy current damper 201 applies a damping force on the rotor 12, thereby reducing vibration. Eddy currents, however, generally result in heat; accordingly, the damper system 200 may include a heat sink (not shown) attached to the housing 202, a refrigeration system, a flow of process, seal, bearing, or another type of fluid into and/or around the housing 202 to remove heat, or any other cooling system to remove heat generated by the eddy current damper 201.

Figure 9:
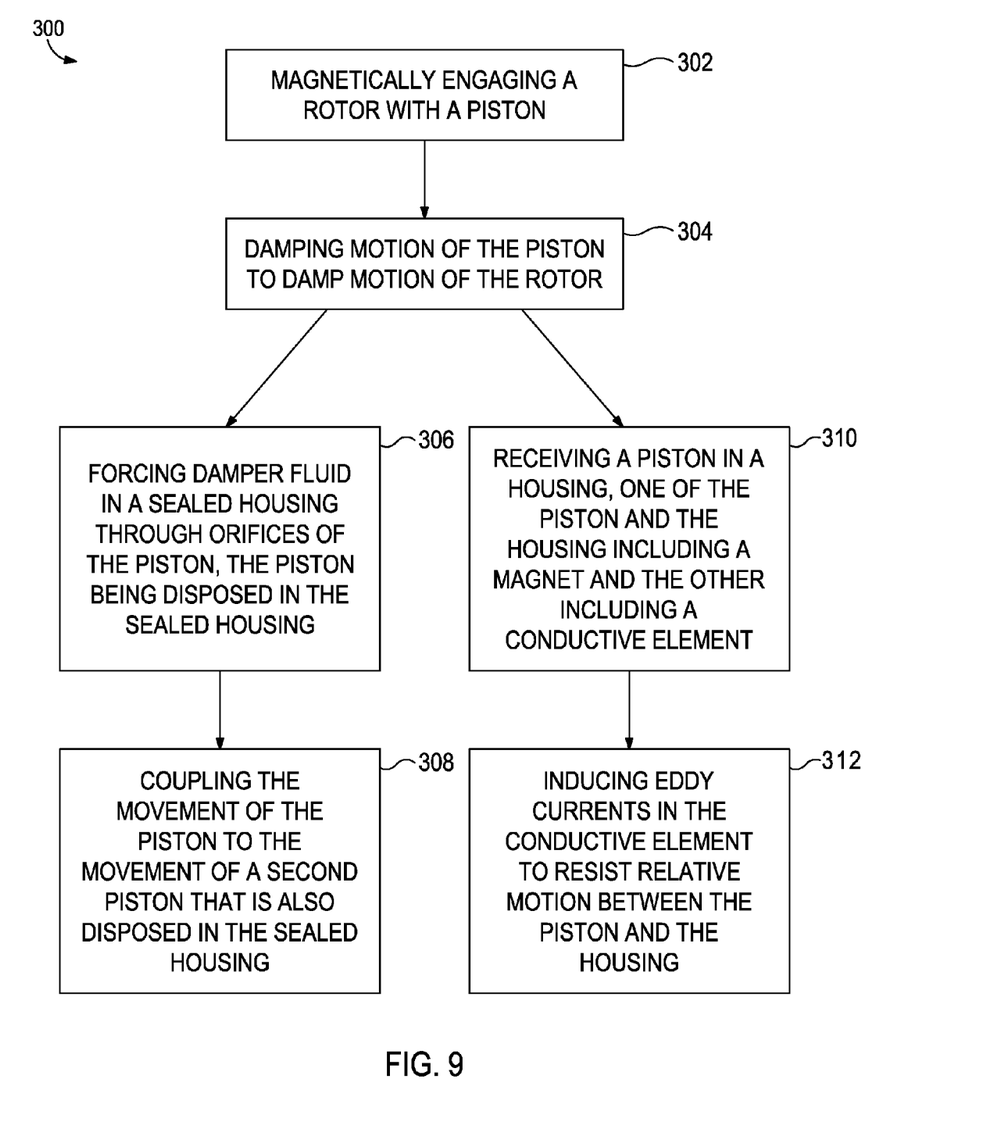
FIG. 9 illustrates a flowchart of a method for damping rotor vibration, according to an embodiment.

FIG. 9 illustrates a flowchart of an exemplary method 300 for damping a rotor, according to an embodiment. The method 300 may proceed by operation of one or more of the embodiments of the damper systems 100, 200 described above with reference to any of FIGS. 1-8 and may thus be best understood with reference thereto. The method 300 may generally include magnetically engaging the rotor with a magnetic element of a piston of a damper system, such that the damper system does not support a weight of the rotor, as at 302. The method 300 may also include damping motion of the piston to damp motion of the rotor, as at 304.

In a specific embodiment, damping motion of the piston, as at 302, may include forcing damping fluid in a sealed housing through orifices defined radially through the piston, the piston being disposed in the sealed housing, as at 306. Further, such damping motion of the piston, as at 302, may also include coupling the movement of the piston to movement of a second, diametrically-opposed piston, the second piston also being disposed in the sealed housing, as at 308. Additionally, damping at 302 may also include receiving the piston in a housing, as at 310. In such an embodiment, one of the piston and the housing may include a magnet, while the other includes a conductive material. Accordingly, the method 300 may thus also include inducing eddy currents in the conductive material with the magnet, as at 312. As such, the eddy currents induce a magnetic field that resists relative movement between the piston and the housing.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

I claim:

1. A damper system for a rotor, comprising:
a magnetic coupling configured to magnetically engage a rotor supported by one or more primary bearings, the magnetic coupling including a first magnet and a second magnet, the first magnet coupled to the rotor and configured to rotate therewith; and
a damper including a piston coupled to the magnetic coupling, the damper being substantially non-load bearing and configured to damp the rotor such that the damper system resists radial movement of the rotor,
wherein the second magnet is coupled to or forms at least a portion of the piston, and the first magnet and the second magnet are configured to apply radially opposing forces at radially opposing points around the rotor such that no net force is applied to the rotor when the rotor is centered in the damper system.

2. The damper system of claim 1, wherein the damper includes an eddy current damper.

3. The damper system of claim 2, wherein the eddy current damper includes a housing, the housing includes a conductive material, such that movement of the piston in the housing induces eddy currents in the conductive material to resist relative movement between the piston and the housing.

4. The damper system of claim 1, wherein the damper includes a dashpot damper.

5. The damper system of claim 1, wherein the damper includes a sealed housing disposed around the rotor, wherein the piston and at least a part of the magnetic coupling are disposed in the sealed housing.

6. The damper system of claim 5, wherein the piston defines orifices extending radially therethrough so as to communicate a first space at least partially defined between a radial-outside of the piston and the sealed housing with a second space at least partially defined between a radial inside of the piston and the sealed housing, the sealed housing being substantially filled with a damping fluid, such that radial movement of the piston forces the damping fluid through the orifices.

7. The damper system of claim 6, wherein the damping fluid is a process fluid, a bearing fluid, a sealing fluid, or a combination thereof.

8. The damper system of claim 5, further comprising a damping fluid circulation system fluidly coupled to an inside of the sealed housing, the damping fluid circulation system configured to remove and cool the damping fluid and return the damping fluid to the inside of the sealed housing.

9. The damper system of claim 5, wherein the piston includes a plurality of arcuate segments connected together by one or more annular rings.

10. The damper system of claim 1, wherein each of the first magnet and the second magnet includes an electromagnet or a permanent magnet.

11. The damper system of claim 1, wherein the magnetic coupling further includes a conductor coupled to the piston.

12. The damper system of claim 11, wherein the conductor is a superconductor.

* * * * *